United States Patent [19]

Wismer et al.

[11] 4,020,193

[45] Apr. 26, 1977

[54] METHOD OF FORMING A NON-GLOSSY FILM

[75] Inventors: Marco Wismer, Gibsonia; Earl E. Parker, Allison Park, both of Pa.

[73] Assignee: PPG Industries, Inc., Pittsburgh, Pa.

[22] Filed: July 10, 1973

[21] Appl. No.: 377,992

Related U.S. Application Data

[63] Continuation of Ser. No. 135,797, April 20, 1971, abandoned.

[52] U.S. Cl. .......................... 427/54; 204/159.15; 260/40 R; 260/861; 260/863; 260/864
[51] Int. Cl.² ...................... C08F 8/00; C08L 67/06
[58] Field of Search ............... 204/159.15; 427/44, 427/54

[56] References Cited

UNITED STATES PATENTS

| | | | |
|---|---|---|---|
| 2,949,361 | 8/1960 | Agens | 204/159.15 |
| 2,985,615 | 5/1961 | Tunteler | 204/159.15 |
| 3,582,487 | 6/1971 | Fuhr et al. | 204/159.15 |
| 3,664,861 | 5/1972 | Okamura et al. | 204/159.15 |
| 3,699,022 | 10/1972 | Behrens et al. | 204/159.23 |
| 3,766,111 | 10/1973 | Metzner et al. | 204/159.15 |

*Primary Examiner*—Murray Tillman
*Assistant Examiner*—Thurman K. Page
*Attorney, Agent, or Firm*—George D. Morris

[57] ABSTRACT

A novel method of preparing a strong, non-glossy material comprises subjecting a composition comprising an unsaturated polyester, an ethylenically unsaturated monomer and a peroxide catalyst to actinic light to cure. In the preferred embodiment, the material comprises pigments and accelerators for room temperature cure of polyester resins. The materials are useful as films and coatings.

8 Claims, No Drawings

METHOD OF FORMING A NON-GLOSSY FILM

This application is a continuation of copending application Ser. No. 135,797, filed Apr. 20, 1971, now abandoned.

A method of forming films and coatings having good strength, mar resistance, wear resistance, and stain resistance is that of subjecting unsaturated polyester resins to actinic light to cure the resins. This method of irradiating with actinic light to cure polyester resins is advantageous as the rate of crosslinking achieved thereby is unobtainable by most other methods.

The prior art method of heat-curing a polyester resin catalyzed with a peroxide has produced glossy films. It has been found also that the actinic light treatment of polyester resins results in glossy films. This is desirable in some cases but in many cases it is necessary to achieve a coating which is flat or has a low gloss. Thus, at the present time, a satisfactory prior art method of producing a non-glossy polyester resin film has been heretofore commercially infeasable.

It has now been discovered that a resin film or coating may be achieved with low gloss by treating a composition comprising an unsaturated polyester, an ethylenically unsaturated monomer, and a peroxide catalyst with actinic light to cure.

The unsaturated polyesters used herein are polyesters of an alpha, beta-ethylenically unsaturated polycarboxylic acid and a polyhydric alcohol.

The ethylenically unsaturated polycarboxylic acids include such acids as:
maleic acid
fumaric acid
aconitic acid
mesaconic acid
citraconic acid
itaconic acid
and halo and alkyl derivatives of such acids and the like; the preferred acid being maleic acid. The anhydrides of these acids, where the anhydrides exist, are, of course, embraced under the term "acid", since the polyesters obtained therefrom are essentially the same whether the acid or anhydride is utilized in the reaction. The ethylenically unsaturated dicarboxylic acids are conventionally employed in an amount of about 10 mol percent to about 100 mol percent, although preferably in an amount of about 20 mol percent to about 80 mol percent of the total mols of acid component in the polyester.

The polyhydric alcohols useful in preparing unsaturated polyester resins include:
ethylene glycol
diethylene glycol
triethylene glycol
polyethylene glycol
propylene glycol
dipropylene glycol
polypropylene glycol
glycerol
neopentyl glycol
pentaerythritol
trimethylol propane
trimethylol ethane
and the like. The preferred polyols for the purposes of this invention have a molecular weight of less than about 2,000 and consist essentially of carbon, hydrogen and oxygen. The polyhydric alcohols are generally employed in an equal molar ratio to the total acid components, or as a slight excess, as, for example, about 5 mol percent excess.

Saturated dicarboxylic acids may be utilized in combination with the unsaturated acid or anhydride in the preparation of unsaturated polyester resins. Such acids increase the length of the polyester without adding additional crosslinking sites, which is a desired feature in some polyesters. Examples of useful dicarboxylic acids which are either saturated or only aromatically unsaturated include:
succinic acid
adipic acid
suberic acid
azelaic acid
sebacic acid
phthalic acid
isophthalic acid
terephthalic acid
tetrachlorophthalic acid
hexachloroendomethylenetetrahydrophthalic acid
and the like. As in the case of the ethylenically unsaturated acids, the anhydrides of these acids, where the anhydrides exist, are, of course, embraced in the term "acid", since the polyesters obtained therefrom are the same. Furthermore, for purposes of the present invention, the aromatic nuclei of such acids as phthalic acid are generally regarded as saturated since the double bonds do not react by addition, as do ethylenic groups. Therefore, wherever the term "saturated dicarboxylic acid" is utilized, it is to be understood that such term includes the aromatically unsaturated dicarboxylic acids. Such "saturated carboxylic acids" may also be referred to as "nonolefinically unsaturated" polycarboxylic acids.

Examples of polymerizable ethylenically unsaturated monomers which are blended with the modified unsaturated polyesters are:
sytrene
divinyl benzene
vinyl acetate
methyl acrylate
methyl methacrylate
hexyl acrylate
octyl acrylate
octyl methacrylate
and the like. The preferred monomers are liquid compounds, soluble in the polyester components. Such monomers should preferably be free of non-aromatic carbon-carbon conjugated double bonds.

The monomer component or components may be employed over a broad range, but usually the proportion thereof, upon a weight basis, will be less than the polyester component. The amount of monomer should be sufficient to provide a liquid, flowable, interpolymerizable mixture. Ordinarily, the percentage of monomer will fall within the range of about 10 percent to about 60 percent by weight of the total mixture of polyester and monomer. At the preferred range, the monomer is present in an amount of about 20 percent to about 50 percent.

Since the polyester component of the interpolymerizable mixture is often highly viscous or even solid at atmospheric temperatures, it is preferred to add the monomer thereto at a temperature sufficient to render the polyester satisfactorily fluid for incorporation with the monomer. This temperature is usually in the range of about 100° C. to about 120° C., which is sufficiently high, in the absence of gelation inhibitors, to induce premature gelation upon introduction of the monomer into the system. This is true even in the absence of free-radical catalysts.

Accordingly, it is preferred to include a gelation inhibitor in one or both components of the mixture. Suitable inhibitors may be selected from the quinonic or phenolic class or from a group of quaternary ammonium salts and amine salts, especially amine halide salts. Suitable inhibitors of the quinonic or phenolic class include:
  p-benzoquinone
  chloranil
  hydroquinone
  3-isopropyl catechol
  4-t-butyl catechol
  3-methyl catechol
  4-ethyl catechol
  4-isopropyl catechol
and the like.

The following are representative examples of halide salts of amines which may be employed as inhibitors:
  trimethylamine hydrochloride
  trimethylamine hydrobromide
  dimethylaniline hydrochloride
  triethylamine hydrochloride
  tri-n-butylamine hydrochloride
  tribenzylamine hydrobromide
  N-benzylaniline hydrochloride
and the like. Useful quaternary ammonium salts include:
  trimethyl benzyl ammonium acid oxalate
  trimethyl benzyl ammonium chloride
  di(trimethyl benzyl ammonium) oxalate
  trimethyl benzyl ammonium maleate
  trimethyl benzyl ammonium tartrate
and the like. Other useful ammonium compounds and amine halide compounds are disclosed in U.S. Pat. Nos. 2,593,787 and 2,646,416, respectively. The quaternary ammonium salts or amine halide salts represent a preferred type of inhibitor for utilization with the novel accelerator system of this invention, although satisfactory results are also achieved when phenolic inhibitors or quinonic inhibitors are utilized.

The gelation inhibitor remains in the solution of polyester interpolymerizable monomer and acts as an inhibitor of gelation during subsequent storage of material before the latter is actually used. The amount of inhibitor required in the mixture during the mixing stage is susceptible to wide variation, but conveniently is in a range of about 0.001 percent to about 0.1 percent by weight, based upon the polyester component of the mixture. Interpolymerizable mixtures of polyesters of alpha,beta-ethylenically unsaturated dicarboxylic acids and monomers containing an inhibitor, as above described, may be stored over substantial periods of time, for example, several weeks or even months, without premature gelation.

The peroxide catalyst for the polyesters are organic peroxides and organic hydroperoxides or esters thereof. Typical organic peroxides useful as catalysts for unsaturated polyester resins include:
  benzoyl peroxide
  acetyl peroxide
  lauroyl peroxide
  methyl ethyl ketone peroxide
  cyclohexanone peroxide
and the like.

Organic hydroperoxides or their esters with carboxylic acids useful as catalysts for unsaturated polyester resins include:
  cumene hydroperoxide
  tertiary butyl hydroperoxide
  ditertiary butyl perphthalate
  methyl ethyl ketone peroxide
  1-hydroxycyclohexyl hydroperoxide
and the like. For the purposes of this invention, the organic hydroperoxides represent a preferred class of catalysts, and best results have been obtained with methyl ethyl ketone peroxide.

Many other useful catalysts such as azobisisobutyronitrile are disclosed in the monograph *Organic Peroxides* by A. V. Tovolsky and R. B. Mesrobian, copyrighted in 1954 by Interscience Publishers, Inc., New York, pages 158–163. These catalysts may be utilized in amounts of about 0.1 percent to about 5 percent by weight based upon the mixture of interpolymerizable materials.

The compositions may also, if desired, contain accelerators for the room temperature catalytic cure of polyester resins such as tertiary aromatic amines such as dimethylaniline or p-toluidine are very effective promoters for diacyl peroxides such as benzoyl peroxide. Similarly, cobalt salts, such as cobalt naphthenate, are very effective promoters for ketone peroxides such as methyl ethyl ketone peroxide. The amount of promoter generally needed varies between about 0.1 and 5 weight-percent and preferably between about 0.2 and 0.5 weight-percent of the polyester-vinyl monomer mixture. The mixtures may be modified by the addition of fillers, pigments, and other materials, if desired.

The coating compositions may contain photosensitizers to aid in the actinic light curing of the composition. Various common photosensitizers are benzoin, benzoin methyl ether, diphenyl disulfide, dibenzyl disulfide, benzil and the like. Generally the coating may comprise from about 0.1 percent by weight of the photosensitizer to about 5 percent by weight of the photosensitizer.

The composition, to get a more pronounced wrinkling effect thus reducing the gloss, should also contain highly ultra-violet absorbent pigments such as titanium dioxide, benzidine yellow, para red, phthalocyanine blue and phthalocyanine green and the like to produce an opaque coating. Other pigments which are not highly ultra-violet absorbing (less than 60 percent) may be used also, such as litharge, antimony oxide and the like. It is noted that, although the pigments may be opaque to actinic light, the composition cures and has a flat finish. The best results are obtained using at least about 5 percent by weight of the flatting pigments.

The composition comprising the polyester, monomer and peroxide catalyst is cured into a non-glossy film by subjecting to actinic light. In general, the use of wave lengths in which sensitivity to actinic light occurs is approximately 1800 to 4000 angstrom units. Various suitable sources of the actinic light are available in the art including by way of example, quartz mercury lamps, ultra-violet cored carbon arcs, and high-flash lamps.

The length of exposure to the actinic light and the intensity of the source may be varied greatly. The treatment is continued until the composition is cured to a hard, non-glossy state.

The novel method of this invention may be used to coat substrates with non-glossy polyester resins by merely applying the composition to the substrate an subjecting the composition to actinic light to cure in situ.

The coated substrates are quite useful as coatings for plywood paneling, cabinets, furniture, printed paper products, cement, and cement asbestos products, and the like.

The following examples set forth specific embodiments of the invention. However, the invention is not to be construed as being limited to these embodiments for there are, of course, numerous possible variations and modifications. All parts and percentages of the examples as well as throughout the specification are by weight unless otherwise indicated.

EXAMPLE 1

A polyester resin was formed by charging a vessel with 980 grams of maleic anhydride, 1480 grams of phthalic anhydride, 1612 grams of propylene glycol, and 0.41 gram of methyl hydroquinone. The reactants were heated at a temperature of 210° C. for 7½ hours, the polyester had an acid number of 46.5 and a Gardner-Holdt viscosity of H. (60 percent in ethyl cellosolve).

To 650 grams of the above prepared polyester were added 350 grams of styrene, 0.1 gram of methyl hydroquinone, 10 grams of benzoin methyl ether, 1 gram of trimethyl benzyl ammonium chloride and 2 cubic centimeters of 12 percent cobalt octoate.

To 100 parts of $TiO_2$ pigment were added 143 parts of the above prepared polyester resin composition. To the above pigmented composition was added 1 percent by weight of methyl ethyl ketone peroxide catalyst and the composition was subjected to 10 passes under the ultra-violet lamp in a nitrogen atmosphere at 15 feet per minute each pass. The cured film had a pencil hardness of 2H and a 60° gloss reading of only 3.

The above film was compared to a film formed by adding 1 percent methyl ethyl ketone peroxide catalyst to the same polyester resin composition and curing by heating at 150° F. for 30 minutes. This film had a pencil hardness of HB but a 60° gloss reading of 95.

EXAMPLES 2 to 5

Various pigmented polyester resins were prepared by adding 35 parts of styrene, 0.01 part of methyl hydroquinone, and 1 part of benzoin methyl ether to 65 parts of a propylene maleate phthalate polyester. In Example 2, 10 parts of para red pigment were added to 90 parts of the polyester resin, in Example 3, 10 parts of benzidene yellow pigment were added to 90 parts of the polyester resin, in Example 4, 10 parts of phthalocyanine blue were added to 90 parts of the polyester resin, and in Example 5, 10 parts of phthalocyanine green pigment were added to 90 parts of the polyester resin.

All of the above examples were catalyzed with 1 percent methyl ethyl ketone peroxide and cured under ultra-violet light for 20 passes at a speed of 15 feet per minute. The resulting films were non-glossy.

Although specific examples of the instant invention have been set forth hereinabove, it is not intended that the invention be limited solely thereto, but to include all the variations and modifications following within the scope of the appended claims.

We claim:
1. The method of preparing a cured, non-glossy film comprising
   A. applying to a substrate a layer of a composition consisting essentially of
      1. a polyester resin comprising
         a. from about 40 percent to about 90 percent by weight of unsaturated polyester prepared from an alpha,beta-ethylenically unsaturated polycarboxylic acid and polyhydric alcohol; and
         b. from about 10 percent to about 60 percent by weight of copolymerizable ethylenically unsaturated monomer;
      2. at least about 5 percent by weight of ultraviolet-absorbing pigment; and
      3. a peroxide catalyst selected from the group consisting of organic peroxides, organic hydroperoxides and esters thereof; and
   B. curing said layer by subjecting it to actinic light.
2. The method of claim 1 wherein the unsaturated monomer is styrene.
3. The method of claim 1 wherein the peroxide catalyst is methyl ethyl ketone peroxide.
4. The method of claim 1 wherein the pigment is titanium dioxide.
5. The method of claim 1 wherein the composition also comprises an accelerator for the cure of the polyester resin.
6. The method of claim 5 wherein the accelerator is a cobalt salt.
7. The method of claim 1 wherein the composition also comprises a photosensitizer.
8. The method of claim 7 wherein the photosensitizer is benzoin methyl ether.

* * * * *